United States Patent
Kubota et al.

(10) Patent No.: US 7,990,100 B2
(45) Date of Patent: Aug. 2, 2011

(54) BATTERY CONTROL DEVICE AND HYBRID FORKLIFT TRUCK EQUIPPED WITH THE DEVICE

(75) Inventors: Yutaka Kubota, Nagoya (JP); Takao Sakurai, Nagoya (JP); Shunsuke Kamei, Nagoya (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 418 days.

(21) Appl. No.: 12/087,463

(22) PCT Filed: Sep. 7, 2007

(86) PCT No.: PCT/JP2007/067896
§ 371 (c)(1),
(2), (4) Date: Aug. 4, 2008

(87) PCT Pub. No.: WO2008/032809
PCT Pub. Date: Mar. 20, 2008

(65) Prior Publication Data
US 2009/0051322 A1    Feb. 26, 2009

(30) Foreign Application Priority Data
Sep. 11, 2006  (JP) ................ 2006-246031

(51) Int. Cl.
H02J 7/14 (2006.01)
H02J 7/04 (2006.01)
H02J 7/16 (2006.01)
H02J 7/24 (2006.01)

(52) U.S. Cl. ........ 320/104; 320/149; 320/152; 320/157; 320/159

(58) Field of Classification Search ................ 320/104
See application file for complete search history.

(56) References Cited

U.S. PATENT DOCUMENTS

| 5,650,931 A | 7/1997 | Nii |
| 6,515,453 B2 * | 2/2003 | Feil et al. ............ 320/132 |
| 2006/0152196 A1 * | 7/2006 | Matsumoto et al. ......... 320/132 |

FOREIGN PATENT DOCUMENTS

| JP | 7-231505 A | 8/1995 |
| JP | 2744386 B2 | 2/1998 |
| JP | 2000-313600 A | 11/2000 |
| JP | 2001-251773 A | 9/2001 |
| JP | 3304507 B2 | 5/2002 |

(Continued)

Primary Examiner — Edward Tso
Assistant Examiner — Ahmed Omar
(74) Attorney, Agent, or Firm — Birch, Stewart, Kolasch & Birch, LLP

(57) ABSTRACT

A hybrid forklift truck is provided with an engine, a battery-driven motor generator, and a battery control device that prevents excessive exhaustion or charging of the battery. The state of charge (SOC) of the battery is determined from the battery voltage and SOC when battery current is zero for at least a predetermined time period and from the battery voltage, current and SOC when discharge current is constant for at least a predetermined time period. SOC is revised whenever battery current is zero or constant for at least the predetermined time period, and SOC at any point of time in operation of the forklift truck is estimated by integrating battery current from the SOC revision and subtracting the integrated current from the revised SOC. Drive power of the engine and motor generator are allocated according to a relationship between permissible discharge and charge current and SOC of the battery.

8 Claims, 7 Drawing Sheets

FOREIGN PATENT DOCUMENTS

| | | |
|---|---|---|
| JP | 2003-9407 A | 1/2003 |
| JP | 2004-42799 A | 2/2004 |
| JP | 2004-215447 A | 7/2004 |
| JP | 2004-361313 A | 12/2004 |
| JP | 2006-170867 A | 6/2006 |
| JP | 2007-151263 A | 6/2007 |

* cited by examiner

BATTERY CONTROL DEVICE AND HYBRID FORKLIFT TRUCK EQUIPPED WITH THE DEVICE

BACKGROUND OF THE INVENTION

1. Field of the Invention

The present invention relates to a battery control device of a hybrid forklift truck, the truck having a traveling section for driving wheels by means of either or both of an engine (such as an internal combustion engine) and a battery-operated motor generator, and a cargo handling section provided with actuators driven by means of either or both of the engine and the battery-operated motor generator to perform lifting up-and-down of cargos, the battery control device controlling discharge/charge current from/to the battery so that excessive exhaustion or excessive charging does not occur in the battery, and a hybrid forklift truck equipped with the battery control device.

2. Description of the Related Art

In recent years, hybrid power units are adopted as high-efficiency driving means of forklift trucks.

Such a hybrid power unit comprises a traveling section for driving traveling wheels by means of either or both of an engine such as an internal combustion engine and a battery-operated electric motor and a cargo handling section provided with an actuators driven by means of either or both of the engine and the battery-operated electric motor and an oil hydraulic motor for recovering potential energy of a lifted cargo when the cargo is lifted down, and the engine or electric motor or engine plus electric motor is selectively used as driving means depending on operating conditions of the forklift truck.

FIG. 8 is a schematic representation of the driving system of such a hybrid forklift truck.

In FIG. 8, reference numeral 1 is a battery, 2 indicates actuators for driving the forklift truck in travel and cargo handling operation, 3 is an engine such as an internal combustion engine, 4 is a motor generator, 6 is a power transmission device mechanically connecting the engine 1, the motor generator 4, and the actuator 2, 5 is an inverter electrically connecting the battery 1 to the motor generator 4.

Reference numeral 010 is a device for estimating remaining capacity of battery 1 based on detected voltage and current of the battery 1. Reference numeral 100 is a controller which includes the device 010 for estimating remaining capacity of battery 010 and outputs an operation control directive to the engine 3 and an operation control directive to the motor generator 4 via the inverter 5.

In the hybrid forklift truck, remaining capacity of the battery 1 (hereafter referred to as SOC (state of charge) of battery) in operation is estimated by the battery SOC estimating device 010 based on detected voltage and integrated current discharged from the battery 1 to the motor generator 4.

In Japanese Patent Gazette No. 3304507 (patent literature 1) discloses a remaining capacity meter of a battery, with which the remaining capacity is determined based on detected voltage and current of the battery and integrated value of current.

In Japanese Laid-Open Patent Application No. 6-59002 (patent literature 2) disclosed a remaining capacity determining method of a battery, with which voltage and current of the battery are measured in accordance with conditions determined and stored in an environment file and remaining capacity of the battery is determined using a correlation table defining relationship between remaining capacity and voltage of battery with discharge current as a parameter.

In a hybrid forklift truck, there occur problems that deterioration of the battery is enhanced when battery SOC, i.e. remaining capacity of the battery is too low and that battery voltage rises extremely when a state that battery SOC is higher than a certain permissible value continues.

Further, as discharging from and charging to the battery occur at frequent intervals in the hybrid forklift truck, the error in estimation of SOC of the battery increases when the SOC is estimated by the battery control device 010 based on voltage and integrated current of the battery 1 as is in the conventional art shown in FIG. 8 caused by battery conditions such as temperature and so on. There has been proposed means to compensate the errors in estimation of SOC of the battery, however, there would be considerable difficulty in raising accuracy of estimation of SOC of battery under the circumstance the battery is used with short stop time of charging and discharging.

Further, when energy is recovered from actuators for traveling operation and cargo handling operation concurrently, there may occur cases that remaining capacity of the battery is high and power possible to be charged to the battery is too small to receive all of the recovered energy or that power possible to be released from the battery is small and required power can not be supplied from the battery, if SOC of the battery is not controlled appropriately. Therefore, it is demanded that allocation of drive power to drive the actuators to the engine and/or battery-operated motor is determined in consideration of power possible (permissible) to be released from the battery. However, the conventional art of estimating SOC of the battery based on voltage and integrated current of the battery as shown in FIG. 8 can not cater to such a demand.

In the patent literatures 1 and 2, means to detect remaining capacity of battery accurately is disclosed, however, an art to link the accurate estimation of SOC of the battery to control allocation of drive power to drive the actuators to the engine and/or battery-operated motor so that excessive exhaustion or excessive charging does not occur in the battery of a hybrid forklift truck is not disclosed.

SUMMARY OF THE INVENTION

The present invention was made in light of the problems mentioned above, and the object of the invention is to provide a battery control device which can estimate SOC of battery in any time point in operation of a forklift truck with high degree of accuracy with influence of battery temperature taken into consideration and controls the battery so that excessive discharge and excessive charge of the battery is prevented by controlling allocation of drive power to drive the actuators appropriately based on SOC of the battery estimated with high degree of accuracy.

To attain the object, the present invention proposes a battery control device of a hybrid forklift truck having a traveling section for driving wheels by means of either or both of an engine and a battery-operated motor generator and a cargo handling section provided with actuators driven by means of either or both of the engine and the battery-operated motor generator to perform lifting up-and-down of cargos, wherein is provided a controller having;

a battery SOC estimating device, by which SOC(state of charge, i.e. remaining capacity) of the battery is determined from an established relationship between battery voltage and SOC of the battery when the battery does not discharge current for at least a predetermined time period and SOC of the battery is also determined from an established relationship between battery voltage, battery current and SOC of the battery when discharge current is constant for at least a predetermined time period, SOC of the battery is revised and reset on every chance that the battery does not discharge current for at least a predetermined time period or discharge current is constant for at least a predetermined time period, and SOC of the battery at any point of time in operation of the forklift truck is estimated by integrating battery current from the time point of SOC revision and subtracting the integrated current from the revised SOC, thus revision of SOC is repeated during operation of the forklift truck and current value of SOC of the battery is estimated with high degree of accuracy; and a drive power allocation control device by which discharge/charge current from/to the battery is controlled based on the estimated SOC of the battery so that excessive discharging and charging from and to the battery is prevented by appropriately controlling allocation of drive power to drive the actuators to the engine and/or motor generator.

According to the invention, SOC of the battery in operation of the forklift truck can be estimated by determining an initial SOC and subtracting integrated battery current integrated from the time point the initial SOC is determined, and the initial SOC is revised every time when SOC of the battery can be determined more accurately without using the integrated current in operation of the forklift truck in order to obtain SOC of the battery with high degree of accuracy in any time point in the operation. Therefore, possible error in integration of battery current to be subtracted from the initial SOC to estimate current SOP SOC can be reduced due to decreased integration period, SOC of battery can be estimated with high degree of accuracy in operation of the forklift truck in which acceleration and deceleration of the truck, lifting up and down of cargos, are repeated at frequent intervals.

SOC of the battery can be determined from a table in which a relationship between battery voltage, battery current and SOC of the battery is established, even when the motor generator is driving the actuators for driving the forklift truck in travel and/or cargo handling operation and battery is discharging current to the motor generator, by detecting a chance when battery discharge current is constant for at least a predetermined time period, so SOC of the battery at any time point of operation of the forklift can be estimated with high degree of accuracy.

Therefore, allocation of drive power to drive the actuators to the engine battery-driven motor generator can be performed appropriately in order to control discharge/charge current of the battery to be in permissible range predetermined as a function of SOC of the battery based on the accurately estimated SOC of the battery.

In the invention, it is preferable that;

(1) A lift lever sensor and a tilt lever sensor are provided, and the controller can detects whether battery discharge current has been constant for at least a predetermined time period based on controlled variables inputted from the a lift lever sensor and/or a tilt lever sensor.

(2) Determination of SOC of the battery by the battery SOC estimating device to reset it when the battery does not discharge current for at least a predetermined time period is performed when an ignition signal of the engine is outputted or when the operator of the forklift truck gets out of driver's seat.

By this, chance of determining initial SOC when battery does not discharge current for at least a predetermined time period can be increased, which result in increased estimation of SOC of the battery.

(3) A standard to limit discharge/charge current from/to the battery depending on SOC of battery is prepared, and the drive power allocation control device controls allocation of drive power to drive the actuators to the engine and/or motor generator so that discharge/charge current from/to the battery is in limited range depending on SOC of battery based on the estimated current SOC of the battery.

In this way, by controlling allocation of drive power to drive the actuators to the engine and/or motor generator based on SOC of the battery estimated with high degree of accuracy, battery current possible (permissible) to be discharged from the battery to the motor generator to drive the actuators is always kept in permissible range which depends on SOC of the battery, and current possible (permissible) to be charged to the battery from the motor generator driven by the actuators when they recover energy and/or the engine to work as a generator is always kept in permissible range which depends on SOC of the battery.

Therefore, occurrence of excessive discharging from the battery and excessive charging of the battery caused by excessive recovered energy in energy recovering operation can be prevented, and occurrence of excessive exhaustion of the battery and occurrence of damages to other devices caused by excessive rise in voltage of the battery due to such excessive charging can be prevented.

(4) The drive power allocation control device appropriates a part of output of the engine to charge the battery when estimated SOC of the battery is smaller than a predetermined value. By this occurrence of unusual reduction of SOC of the battery can be prevented by appropriating a part of output of the engine to drive the motor generator to charge the battery when SOC of the battery becomes smaller than a predetermined value.

Further, the invention proposes a hybrid forklift truck equipped with a battery control device according to any one of claims 1-5. A hybrid forklift truck driven by an engine and/or battery-driven motor generator can be provided which is composed such that SOC of the battery is estimated with high degree of accuracy at any time point in operation of the forklift truck and allocation of drive power to drive the actuators of traveling and cargo handling mechanism of the forklift truck to the engine and/or battery-operated motor is controlled appropriately using accurately estimated SOC of the battery so that excessive exhaustion or excessive charging does not occur in the battery.

According to the invention, SOC of the battery in operation of the forklift truck can be estimated by determining an initial SOC and subtracting integrated battery current integrated from the time point the initial SOC is determined, and SOC of the battery can be estimated with high degree of accuracy in any time point in operation of the forklift truck which experiences acceleration, deceleration, lifting up and down of cargos repeatedly at frequent intervals.

Further, SOC of the battery can be determined from a table in which a relationship between battery voltage, battery current and SOC of the battery is established, even when the motor generator is driving the actuators for driving the forklift truck in travel and/or cargo handling operation and battery is discharging current to the motor generator, by detecting a chance when battery discharge current is constant for at least a predetermined time period, so SOC of the battery at any time point of operation of the forklift can be estimated with high degree of accuracy.

Therefore, allocation of drive power to drive the actuators to the engine battery-driven motor generator can be performed appropriately in order to control discharge/charge current of the battery to be in permissible range predetermined as a function of SOC of the battery based on accurately estimated SOC of the battery.

According to the invention, by controlling allocation of drive power to drive the actuators to the engine and/or motor generator based on SOC of the battery estimated with high degree of accuracy, battery current possible (permissible) to be discharged from the battery and possible (permissible) to be charged to the battery is always kept in permissible range which depends on SOC of the battery in operation of the forklift truck, so occurrence of excessive discharging from the battery and excessive charging of the battery caused by excessive recovered energy in energy recovering operation can be prevented, and occurrence of excessive exhaustion of the battery and occurrence of damages to other devices caused by excessive rise in voltage of the battery due to such excessive charging can be prevented.

DETAILED DESCRIPTION OF THE INVENTION

Embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
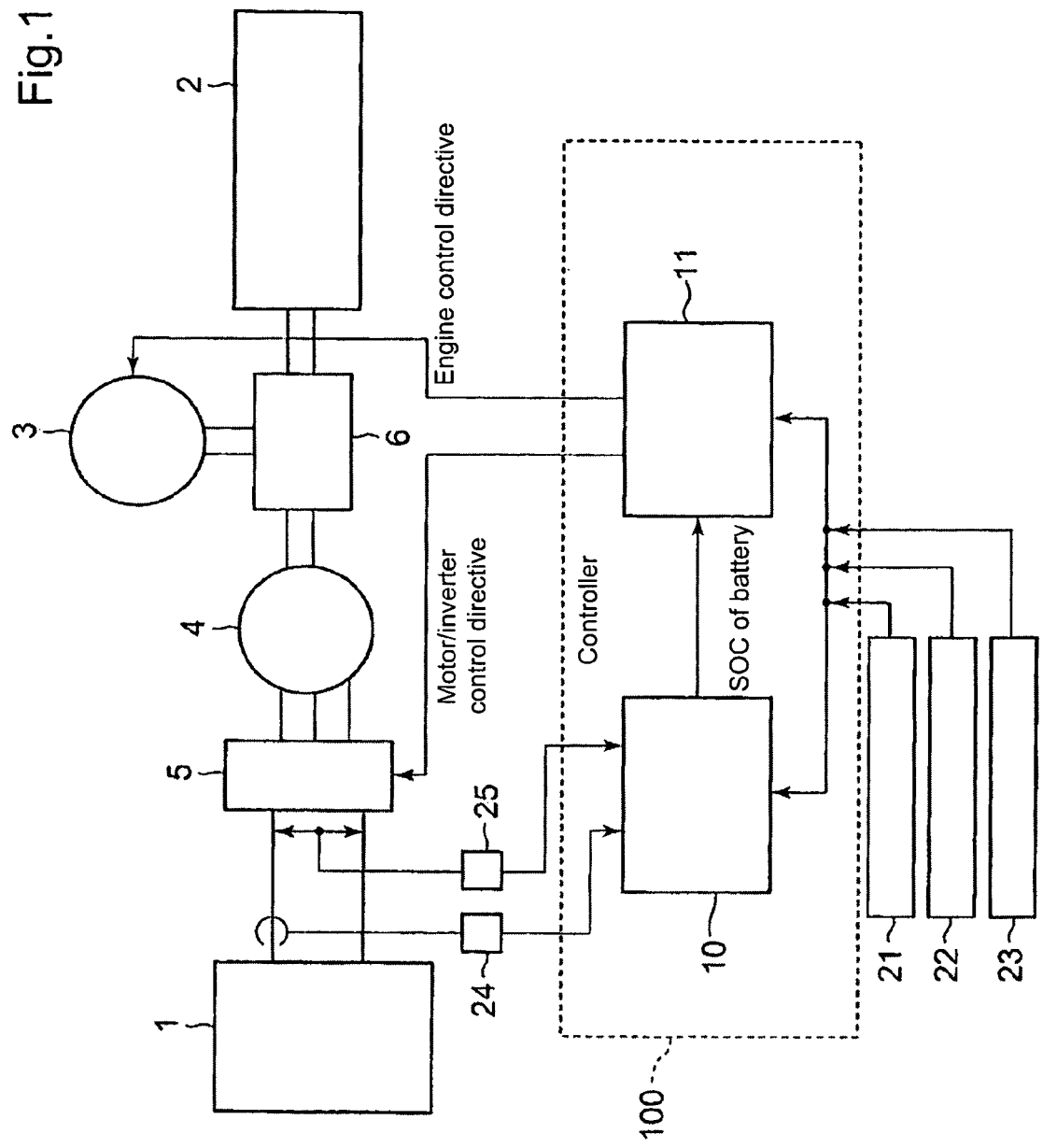
FIG. 1 is a schematic representation of the driving system of the hybrid forklift truck to which the battery control device according to the present invention is applied.

FIG. 1 is a schematic representation of the driving system of the hybrid forklift truck to which the battery control device according to the present invention is applied.

Referring to FIG. 1, reference numeral 1 is a battery, 2 indicates actuators for driving the forklift truck in travel and cargo handling operation, 3 is an engine such as an internal combustion engine, 4 is a motor generator, 6 is a power transmission device mechanically connecting the engine 1, the motor generator 4, and the actuator 2, 5 is an inverter electrically connecting the battery 1 to the motor generator 4. Driving operation and cargo handling operation of the hybrid forklift truck are performed either or both of the engine 3 and motor generator 4 via the actuators 2.

In driving operation (traveling and/or cargo lifting operation) by the engine 3, the output power of the engine 3 is transmitted via the power transmission device 6 to the traveling actuator of the actuators 2 to drive the drive wheels of the forklift truck when performing traveling operation of the forklift truck and to the cargo handling actuator of the actuators 2 to drive the lifter of the forklift truck when performing cargo handling operation of the forklift truck.

In driving operation (traveling and/or cargo lifting operation) by the motor generator 4, DC power supplied from the battery 1 is converted via the inverter 5 to AC power which is controllable in frequency to be supplied to the motor generator 4, and the drive power of the motor generator 4 is transmitted via the power transmission device 6 to the traveling actuator of the actuators 2 to drive the drive wheels of the forklift truck when performing traveling operation of the forklift truck and to the cargo handling actuator of the actuators 2 to drive the lifter of the forklift truck when operating cargo handling operation of the forklift truck.

In driving operation (traveling and/or cargo lifting operation) by the engine 3 plus motor generator 4, both the drive power of the engine 3 and the motor generator 4 is transmitted via the power transmission device 6 to the traveling actuator of the actuators 2 to drive the drive wheels of the forklift truck when performing traveling operation of the forklift truck, thus, the wheels are driven by the sum of the drive power of the engine 3 and motor generator 4. When performing cargo handling operation of the forklift truck, both the drive power of the engine 3 and the motor generator 4 is transmitted via the power transmission device 6 to the traveling actuator of the actuators 2 to drive the lifter of the forklift truck, thus, the lifter is driven by the sum of the drive power of the engine 3 and motor generator 4.

Reference numeral 100 is a controller, which includes a battery SOC estimating device 10 for estimating remaining capacity of the battery 1 based on detected voltage and current of the battery 1 and a drive power allocation control device 11 which outputs an engine control directive and a motor/inverter control directive to control allocation of drive power to drive the actuators 2 to the engine 3 and/or motor generator 4, as detailed later.

Reference numeral 24 is a voltmeter for detecting battery terminal voltage and 25 is an ammeter for detecting battery terminal current. Reference numeral 21 and 22 are respectively a lift lever sensor and a tilt lever sensor for detecting lift lever position and tilt lever position of the cargo handling equipment of the forklift truck. Reference numeral 23 is an ignition sensor which outputs an operational signal of the starter of the engine (ignition signal).

Battery voltage detected by the voltmeter 24 and battery current detected by the ammeter 25 are inputted to the battery SOC estimating device 10 in the controller 100.

Lift lever position detected by the lift lever sensor 21, tilt lever position detected by the tilt lever sensor 22, and the ignition start signal from the ignition sensor 23 are inputted to the battery SOC estimating device 10 and to the drive power allocation control device 11 in the controller 100.

Next, working of the battery SOC estimating device 10 will be explained with reference to FIGS. 1, 2 and FIGS. 5-7.

Figure 2:
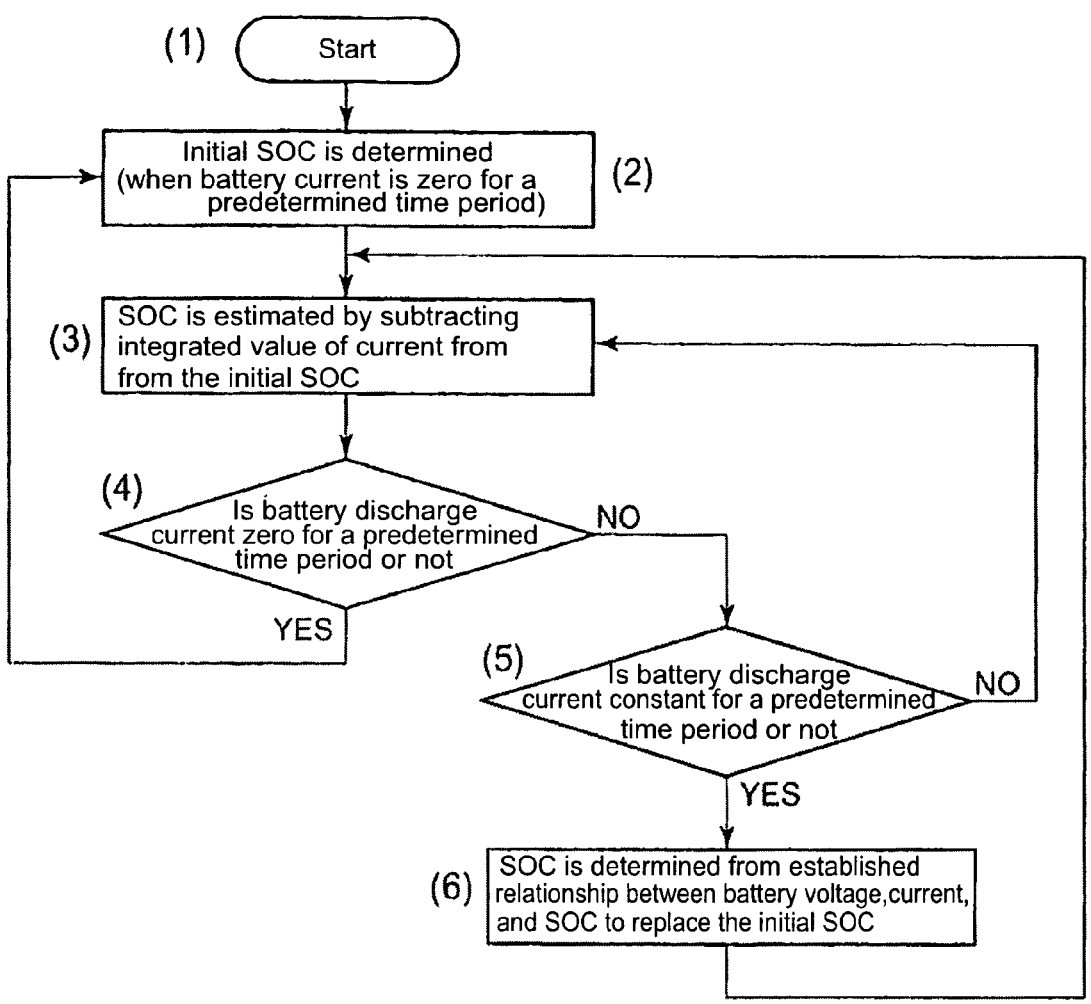
FIG. 2 is an estimation flowchart of the battery SOC estimating device of the battery control device according to the invention.

FIG. 2 is an estimation flowchart of the battery SOC estimating device of the battery control device according to the invention.

Figure 5:
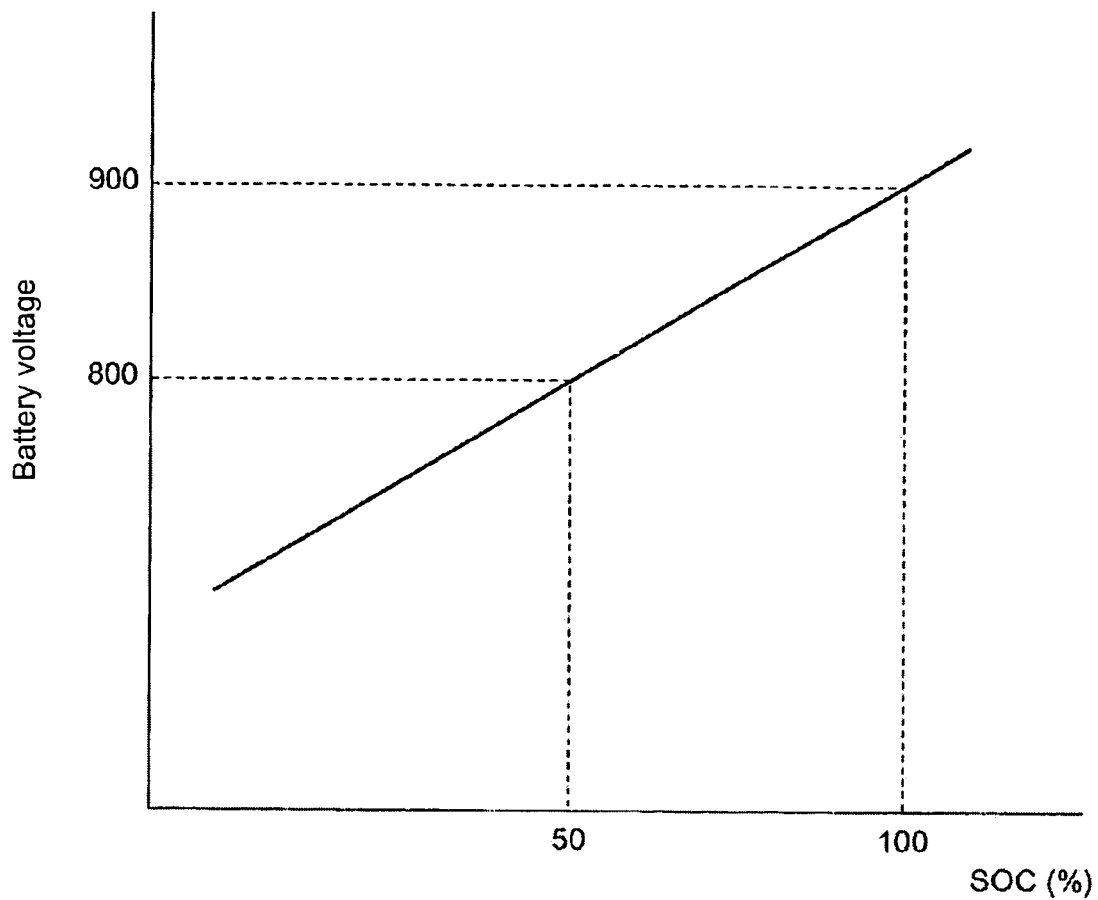
FIG. 5 is a graph showing a relationship between SOC and voltage of the battery when current is not discharged from the battery.
Figure 6:
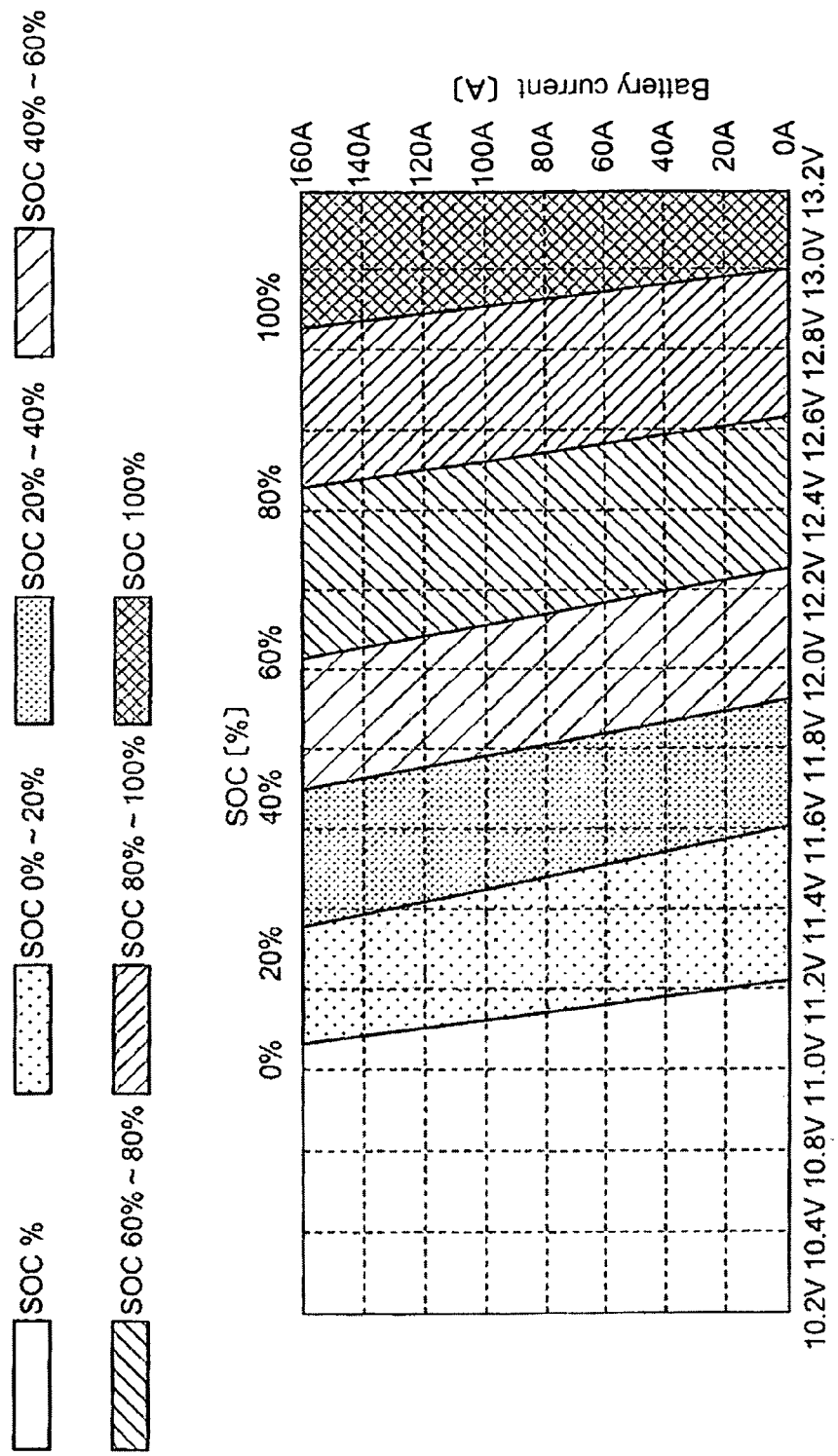
FIG. 6 is a table showing a relationship between battery voltage, battery current, and SOC of the battery when battery temperature is 25° C.
Figure 7:
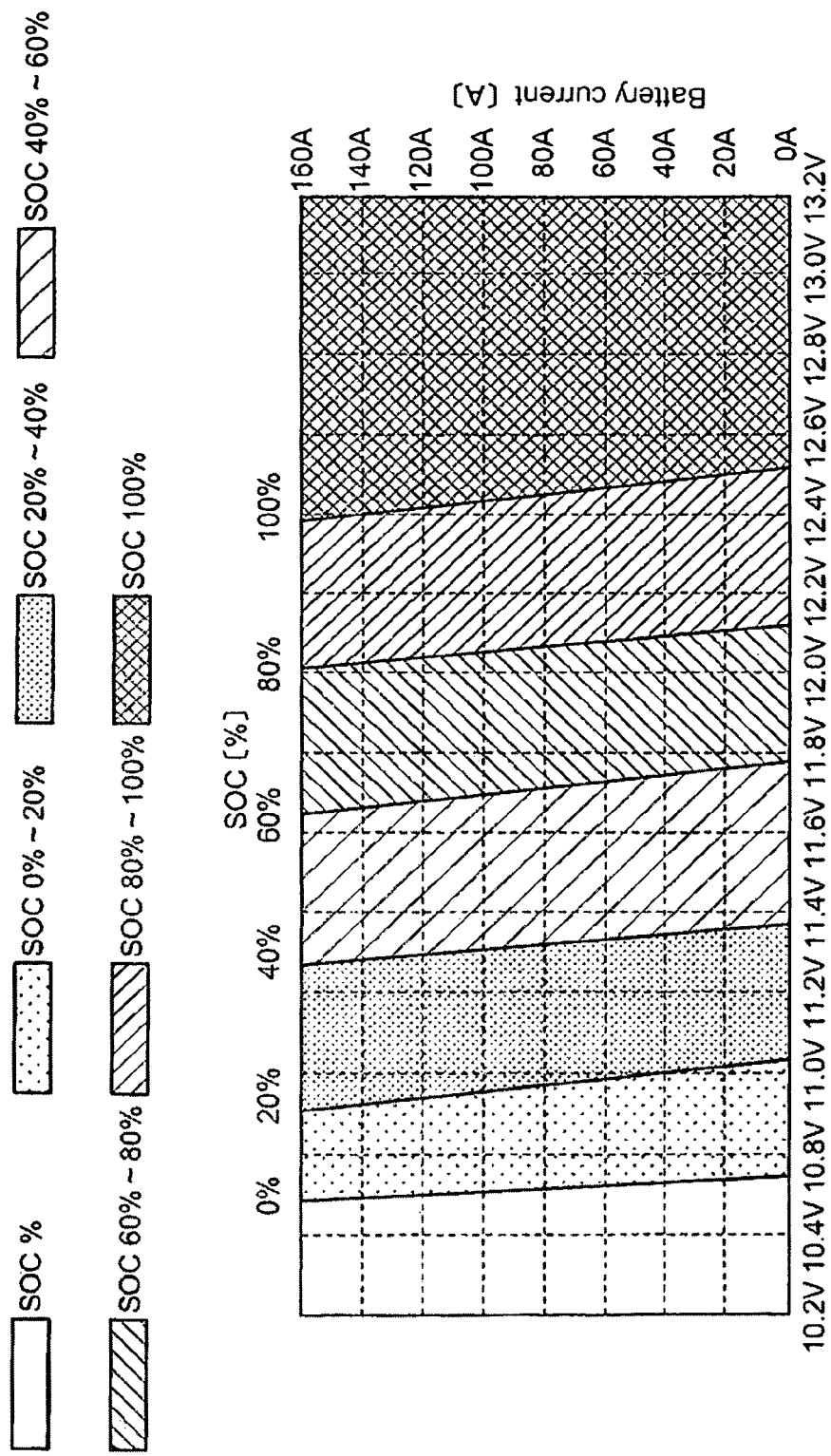
FIG. 7 is a table showing a relationship between battery voltage, battery current, and SOC of the battery when battery temperature is 0° C.
Figure 8:
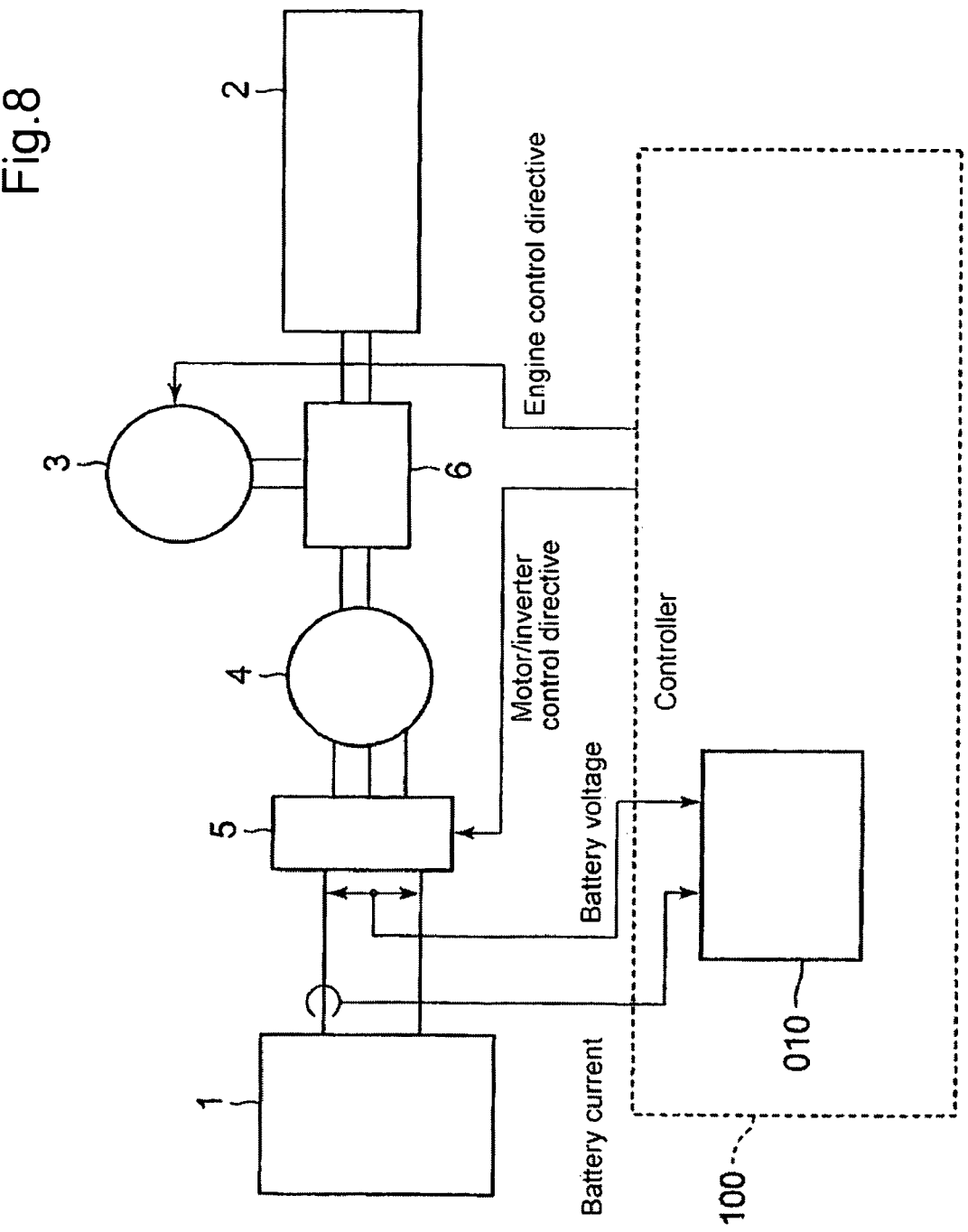
FIG. 8 is a schematic representation of the driving system of a conventional hybrid forklift truck.

In FIG. 2, when the engine 3 is started (step(1)), initial value of SOC (remaining capacity) of the battery 1 is determined from a battery voltage-SOC graph of FIG. 5 by using the battery voltage detected by the voltmeter 24 when current is not discharged from the battery and the initial SOC is memorized (step(2)).

Then, when battery 1 discharges current to operate the motor generator 4, the current detected by the ammeter 25 is integrated and remaining capacity (SOC) of the battery at the present time is determined by subtracting the integrated value of the detected current from the initial value of remaining capacity (step(3)).

Then, whether discharge current of the battery 1 is zero for at least a predetermined time period or not, that is, whether the motor generator 4 is not operated for at least the predetermined time period, is judged (step(4)).

When judged 'yes' in step(4), that is, when battery discharge current is zero for at least the predetermined time period, the flow returns to step(2). This judgment can be done by detecting battery current by the ammeter 25. This judgment can also be done by detecting whether the ignition signal (engine start signal) is outputted from the ignition sensor 23 or not, that is, whether the engine 3 is started or not. By adopting both the judging means, chance of estimating initial remaining capacity (SOC) of the battery 1 can be increased and initial SOC can be often reset resulting in improved accuracy of estimation of SOC at the present state of operation of the forklift truck.

When judged 'no' in step(4), that is, when the time period during which battery discharge current is zero is shorter than the predetermined time period, the flow goes to step(5), where whether battery discharge current is constant for at least a predetermined time period or not is judged.

When judged 'yes' in step(5), that is, when it is confirmed that battery discharge current has been constant for at least the predetermined time period, the flow goes to step(6), where revised initial SOC is determined from a table, in which a relationship between battery voltage, battery current, and SOC of the battery is established, using the detected battery voltage, current, and temperature. The flow returns to step(3) from step(6) to repeat revision of initial SOC. A plurality of tables is prepared in the battery SOC estimating device 10 for every battery temperature to determine remaining capacity of battery in accordance with battery voltage and battery discharge current continued constant for at least the predetermined time period as shown for example in FIG. 6 for battery temperature of 25° C. and in FIG. 7 for battery temperature of 0° C.

When judged 'no' in step(5), that is, when battery discharge current has not been constant for at least the predetermined time period, the flow returns to step(3) without revising initial SOC to repeat processes from step(3) to step(6). By repeating the process from step(3) to Step(6), initial SOC is revised frequently even during operation of the forklift truck in which acceleration and deceleration of the truck and lifting up and down of cargos are repeated, and SOC of the battery at the present time of operation can be estimated with high degree of accuracy.

Judgment of whether battery discharge current has been constant for at least the predetermined time period or not may be performed by detecting whether either or both of the lift lever position detected by the lift lever sensor 21 and the tilt lever position detected by the tilt lever sensor 22 have been maintained at a constant position or positions for at least the predetermined time period.

As a state that battery discharge current is constant for at least the predetermined time period can be detected by detecting controlled variables of the lift lever and tilt lever in this way, it is not necessary to provide the ammeter and operational device to calculate SOC of the battery, and the state that battery discharge current is constant for at least the predetermined time period can be detected by inexpensive means.

According to the battery SOC estimating device 10 in the controller 100, initial SOC of the battery is determined from a relationship between SOC of battery and battery voltage when the battery is not discharging current, present value of SOC of the battery when the battery is discharging current is estimated by subtracting integrated value of battery current from the initial SOC (remaining capacity) of the battery, the initial SOC of the battery is revised in accordance with the table which gives a value of SOC of battery for a value of battery voltage, current, and temperature when the battery current is maintained constant, present value of SOC of the battery is estimated by subtracting integrated value of battery current from the revised initial SOC (remaining capacity) of the battery. Therefore, initial SOC of battery can be revised repeatedly and period of integration of discharge current of the battery can be shortened resulting in decreased error of discharge current integration, and accuracy of estimation of battery SOC at present time in operation of the forklift truck is improved.

Therefore, power possible to be charged to the battery 1 and power possible to be released from the battery 1 can be known accurately always, and allocation of drive power to drive the actuators 2 to the engine 3 and/or the motor generator 4 can be controlled more appropriately taking into consideration the more accurately estimated remaining capacity of the battery 1 into consideration.

According to the battery SOC estimating device 10, SOC of the battery 1 is estimated when the battery 1 supply current for at least a predetermined time period to the motor generator 4 to drive the actuators 2, the estimated SOC is reset as revised initial SOC, and battery discharge current is integrated from the reset time point to estimate SOC of the battery 1 at present time of operation of the forklift truck by subtracting the integrated value of the current form the revised initial SOC, so SOC of the battery 1 can be estimated with high degree of accuracy even in a state the forklift truck is traveling and/or performing cargo handling operation driven by the motor generator 4 to which electric power is supplied from the battery 1.

Figure 3:
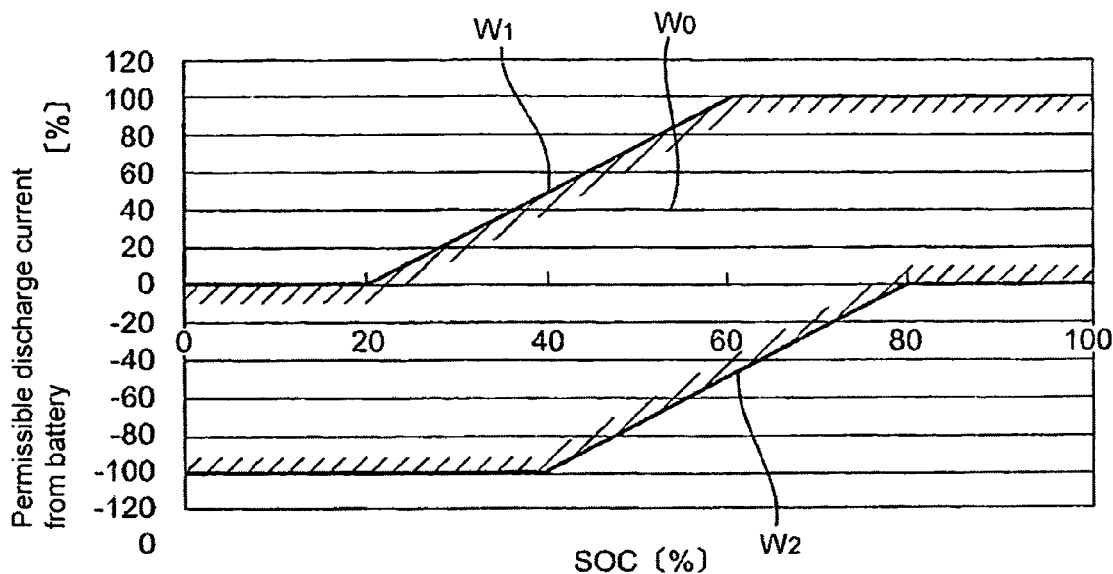
FIG. 3 is a graph (I) showing a relationship between SOC (state of charge) of the battery and power possible to be released from the battery.

The drive power allocation control device 11 in the controller 100 in FIG. 1 is provided with a battery discharge/charge current limit setting table in which a battery discharge current limit line W1 and a battery charge current limit line W2 are determined for SOC of the battery as shown in FIG. 3. In FIG. 3, the ordinate represents W (battery discharge/charge current) in percentage of the maximum discharge current of the battery and abscissa represents state of charge (SOC) of the battery, i.e. remaining capacity of the battery, and '+' side region of W below the line W1 line is a region of power (discharge current) possible (permissible) to be released from the battery and '−' side region of W above the line W2 is a region of power (charge current) possible (permissible) to be charged to the battery.

The drive power allocation control device 11 controls allocation of drive power to drive the actuators 2 to the engine 3 and/or motor generator 4 in accordance with the SOC of the battery estimated by the battery SOC estimating device 10 with high degree of accuracy so that discharge current from the battery 1 does not exceed the limit line W1 and charge current to the battery 1 does not exceed the limit line W2, that is discharge/charge current from/to the battery 1 is always in the region W0 between the limit line W1 and W2 in FIG. 3 for every SOC value of the battery 1.

According to the invention, by properly allocating drive power to drive the actuators to the engine 3 and/or motor generator 4 based on present state of remaining capacity of the battery 1 estimated with high degree of accuracy, traveling and/or cargo lifting operation by driving the actuators 2, i.e. energy consuming operation, and energy recovering operation by driving the motor generator 4 by the actuators 2 to charge the battery 1, can be performed while maintaining discharge/charge current from/to the battery 1 in the permissible discharge/charge current range W0 between the discharge current limit line W1 and charge current limit line W2 determined as a function of SOC of the battery 1 and established in the battery discharge/charge current limit setting table provided in the drive power allocation control device 11, as mentioned above.

Therefore, occurrence of excessive discharging from the battery 1 and excessive charging of the battery 1 caused by excessive recovered energy in energy recovering operation can be prevented, and occurrence of excessive exhaustion of the battery 1 and occurrence of damages to other devices caused by excessive rise in voltage of the battery 1 due to such excessive charging can be prevented.

In FIG. 3, when discharge current above the line W1 is required to supply to the motor generator 4 to drive the actuators 2, power corresponding to the difference between the required discharge current and the possible (permissible) discharge current is supplied by the engine 3, for example, when SOC is smaller than 20%, current discharge from the battery 1 is not allowed and power required to drive the actuators is supplied by the engine 3.

Figure 4:
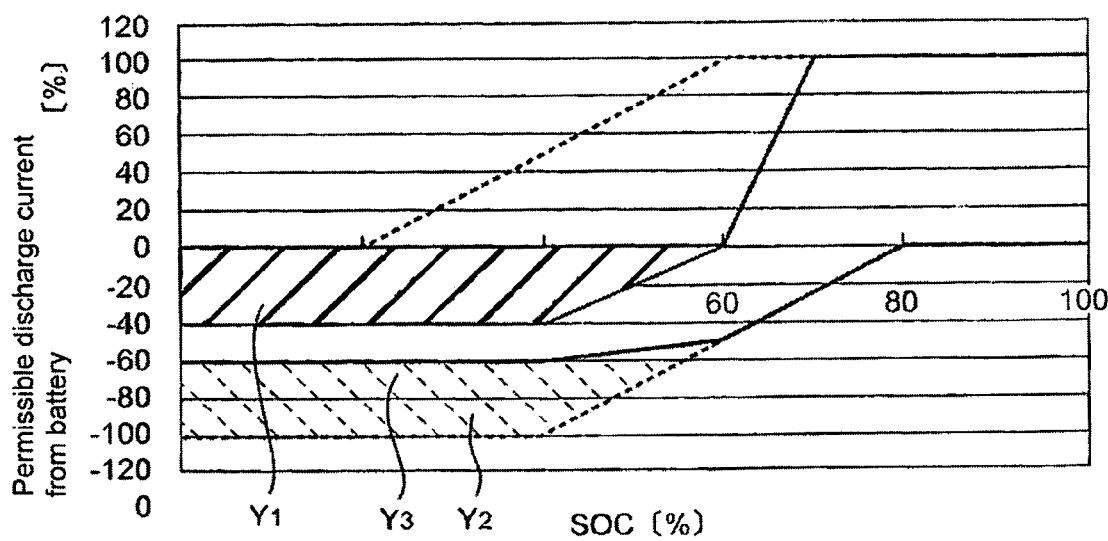
FIG. 4 is a graph (II) showing a relationship between SOC (state of charge) of the battery and power possible to be released from the battery.

It is preferable to set the battery discharge/charge current limit setting table such that, for example as shown in FIG. 4, when estimated SOC of the battery 1 is lower than a predetermined lower limit value, charge current in a region Y1 (portion hatched with solid oblique lines) is charged by driving the motor generator 4 by a part of output of the engine 3, charge current limit line is shifted up to a limit line Y3 by reducing the permissible charge of the battery 1 by a region Y2 (portion hatched with broken oblique lines) in a SOC range smaller than 60%, and possible (permissible) discharge current is set to zero in a SOC range smaller than 60%.

With this setting, when SOC of the battery 1 becomes lower than a lower limit value (60% in FIG. 4), possible (permissible) discharge current from the battery 1 is reduced to zero and on the other hand a part of output of the engine 3 is used to drive the motor generator 4 to charge the battery 1, so excessive decrease of SOC of the battery 1 can be prevented.

As described in the foregoing, according to the invention, remaining capacity of battery is estimated with high degree of accuracy in operation of the forklift truck, and discharge/charge current of the battery is controlled so that excessive exhaustion or excessive charging does not occur in the battery by determining permissible discharge/charge current from/to the battery as a function of SOC of battery and controlling allocation of power to drive the actuators to the engine and battery-operated motor so that discharge/charge current from/to the battery is always in the range of the permissible discharge/charge current established depending on SOC of battery.

INDUSTRIAL APPLICABILITY

According to the invention, a battery control device which estimates SOC of battery in operating state of a forklift truck with high degree of accuracy and allocates drive power to drive actuators which work to allow the forklift truck to travel and/or perform cargo handling appropriately to the engine and battery-operated motor based on the estimated SOC of the battery so that excessive exhaustion or excessive charging does not occur in the battery and a hybrid forklift truck equipped with the battery control device can be provided.

The invention claimed is:

1. A battery control device of a hybrid forklift truck having a traveling section for driving wheels by means of either or both of an engine and a battery-operated motor generator and a cargo handling section provided with actuators driven by means of either or both of the engine and the battery-operated motor generator to perform lifting up-and-down of cargos, comprising:
   a controller that has,
      a battery SOC estimating device, by which SOC (state of charge, indicative of remaining capacity) of the battery is determined from an established relationship between battery voltage and SOC of the battery when the battery does not discharge current for at least a predetermined time period and SOC of the battery is also determined when discharge current is constant for at least a predetermined time period from an established relationship between battery voltage, battery current and SOC of the battery, SOC of the battery is revised and reset every time the battery does not discharge current for at least a predetermined time period or discharge current is constant for at least a predetermined time period, and SOC of the battery at any point of time in operation of the forklift truck is estimated by integrating battery current from the time point of SOC revision and subtracting the integrated current from said revised SOC, thus revision of SOC is repeated during operation of the forklift truck and current value of SOC of the battery is estimated with high degree of accuracy; and
      a drive power allocation control device by which discharge/charge current from/to the battery is controlled based on said estimated SOC of the battery so that excessive discharging and charging from and to the battery is prevented by appropriately controlling allocation of drive power to drive the actuators to the engine and/or motor generator,
      wherein a lift lever sensor and a tilt lever sensor are provided, and said controller detects whether battery discharge current has been constant for at least a predetermined time period based on controlled variables inputted from said a lift lever sensor and/or a tilt lever sensor.

2. A battery control device of a hybrid forklift truck according to claim 1, wherein determination of SOC of the battery by said battery SOC estimating device to reset an initial SOC when the battery does not discharge current for at least a predetermined time period is performed when an ignition signal of the engine is outputted or when an operator of the forklift truck gets out of driver's seat.

3. A battery control device of a hybrid forklift truck according to claim 1, wherein a standard to limit discharge/charge current from/to the battery depending on SOC of battery is prepared, and said drive power allocation control device controls allocation of drive power to drive the actuators to the engine and/or motor generator so that discharge/charge current from/to the battery is in limited range depending on SOC of battery based on said estimated current SOC of the battery.

4. A battery control device of a hybrid forklift truck according to claim 3, wherein said drive power allocation control device appropriates a part of output of the engine to charge the battery when estimated SOC of the battery is smaller than a predetermined value.

5. A hybrid forklift truck equipped with a battery control device according to claim 1.

6. A hybrid forklift truck equipped with a battery control device according to claim 2.

7. A hybrid forklift truck equipped with a battery control device according to claim 3.

8. A hybrid forklift truck equipped with a battery control device according to claim 4.

* * * * *